United States Patent
Yoshitsugu

(10) Patent No.: US 10,175,636 B2
(45) Date of Patent: Jan. 8, 2019

(54) SEALING MEMBER AND IMAGE FORMING APPARATUS

(71) Applicant: FUJI XEROX CO., LTD., Tokyo (JP)

(72) Inventor: Koji Yoshitsugu, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/243,298

(22) Filed: Aug. 22, 2016

(65) Prior Publication Data

US 2017/0248900 A1 Aug. 31, 2017

(30) Foreign Application Priority Data

Feb. 25, 2016 (JP) ................... 2016-034773

(51) Int. Cl.
| | |
|---|---|
| G03G 21/16 | (2006.01) |
| F16J 15/02 | (2006.01) |
| F16J 15/06 | (2006.01) |
| B65H 1/00 | (2006.01) |
| G03G 15/00 | (2006.01) |

(52) U.S. Cl.
CPC .......... *G03G 21/1633* (2013.01); *B65H 1/00* (2013.01); *F16J 15/025* (2013.01); *F16J 15/061* (2013.01); *G03G 15/6502* (2013.01); *G03G 15/6552* (2013.01)

(58) Field of Classification Search
CPC .................................................... F16J 15/025
USPC ......................................................... 399/393
See application file for complete search history.

(56) References Cited

U.S. PATENT DOCUMENTS

| | | | | | |
|---|---|---|---|---|---|
| 3,276,167 | A | * | 10/1966 | Hirche ................ | A47B 61/006 292/76 |
| 3,750,333 | A | * | 8/1973 | Vance ................... | E06B 3/827 49/489.1 |
| 5,970,866 | A | * | 10/1999 | Okawa .................. | B41F 13/42 101/118 |
| 7,469,905 | B2 | * | 12/2008 | Knapp ................. | F16L 17/025 277/608 |
| 2004/0188953 | A1 | * | 9/2004 | Fonville ............... | F16J 15/025 277/603 |
| 2010/0148452 | A1 | * | 6/2010 | Westhoff ................. | E03F 3/04 277/605 |
| 2015/0108711 | A1 | | 4/2015 | Ryuzaki et al. | |
| 2015/0276060 | A1 | * | 10/2015 | McGrath ............... | F16J 15/027 277/642 |

FOREIGN PATENT DOCUMENTS

| | | | | |
|---|---|---|---|---|
| FR | 2974874 | A1 * | 11/2012 | ............. F16J 15/025 |
| JP | 2015-081980 | A | 4/2015 | |

\* cited by examiner

*Primary Examiner* — Anthony Nguyen
(74) *Attorney, Agent, or Firm* — Oliff PLC

(57) ABSTRACT

A sealing member sealing a gap between one member and another member includes a mounting portion that is mounted on the one member and an extension portion that extends from a mounting portion side to another member side and contacts with the other member. In the sealing member, the extension portion includes an assist portion that is formed in one end toward the other member side and assists spring-up of the extension portion in accordance with sliding of the other member or the one member.

13 Claims, 11 Drawing Sheets

Related Art

SEALING MEMBER AND IMAGE FORMING APPARATUS

CROSS-REFERENCE TO RELATED APPLICATIONS

This application is based on and claims priority under 35 USC 119 from Japanese Patent Application No. 2016-034773 filed Feb. 25, 2016.

BACKGROUND

Technical Field

The present invention relates to a sealing member and an image forming apparatus.

SUMMARY

According to an aspect of the invention, there is provided a sealing member that seals a gap between one member and another member, the sealing member including:
a mounting portion that is mounted on the one member; and
an extension portion that extends from a mounting portion side to another member side and contacts with the other member,
wherein the extension portion includes an assist portion that is formed in one end toward the other member side and assists spring-up of the extension portion in accordance with sliding of the other member or the one member.

BRIEF DESCRIPTION OF THE DRAWINGS

Exemplary embodiments of the present invention will be described in detail based on the following figures, wherein:

FIGS. 3A and 3B are views describing in detail a pull-out portion in the exemplary embodiment, of which FIG. 3A is a view describing a contacted portion of the pull-out portion, and FIG. 3B is a view describing an entire configuration of a gasket as an example of a pull-out sealing portion;

DETAILED DESCRIPTION

Hereinafter, an exemplary embodiment of the invention will be described with reference to the drawings in detail.

Image Forming Apparatus 1

Figure 1:
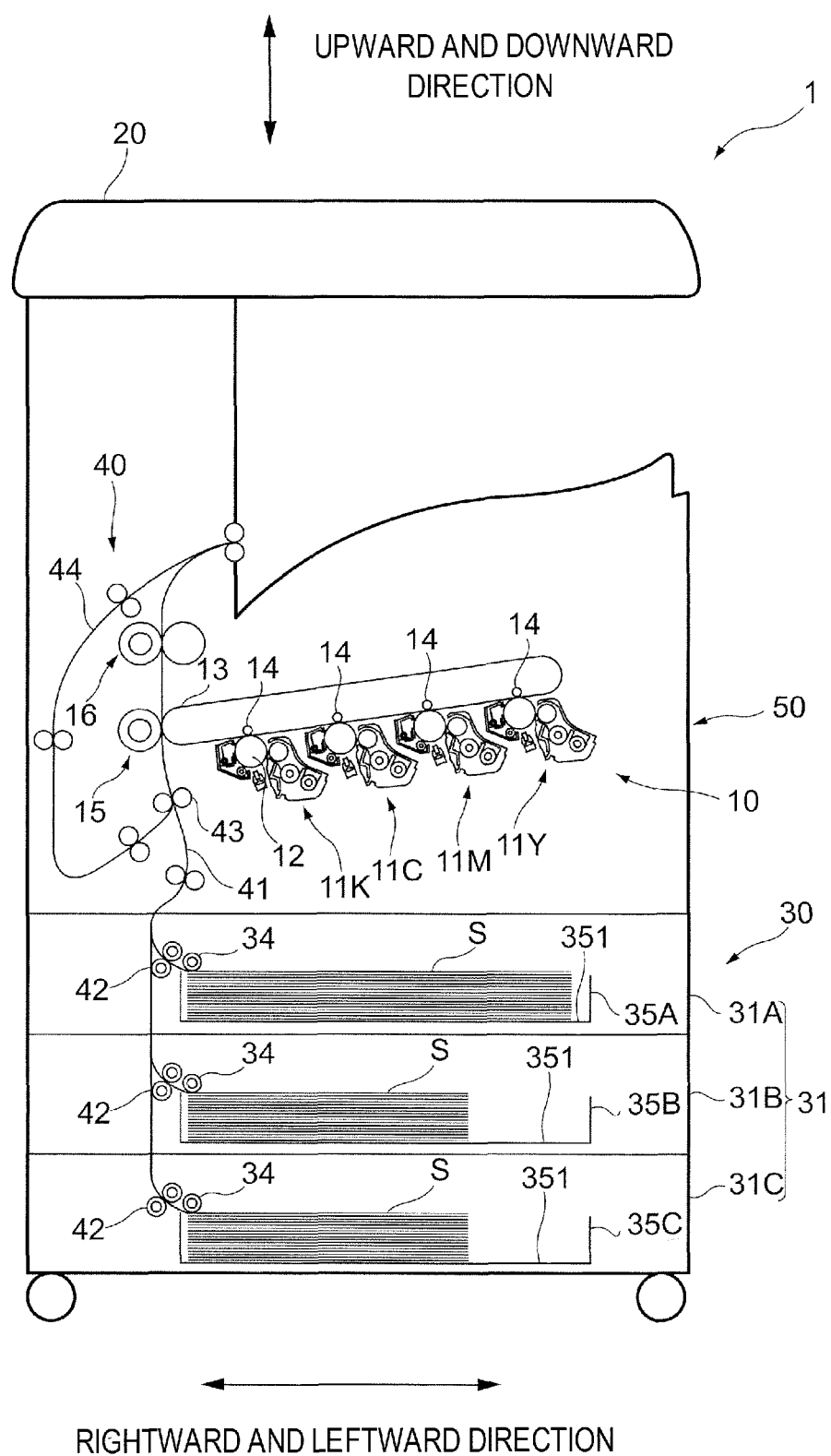
FIG. 1 is a view illustrating an entire configuration of an image forming apparatus in an exemplary embodiment.

FIG. 1 is a view illustrating an entire configuration of an image forming apparatus 1 of the exemplary embodiment.

As illustrated in FIG. 1, the image forming apparatus 1 as an example of the image forming apparatus includes an image forming portion 10 that forms an image corresponding to image data of each color, an image reading device 20 that reads an image of an original document, a sheet supply portion 30 that supplies a sheet to the image forming portion 10, and a sheet transport system 40 that transports the sheet supplied from the sheet supply portion.

Furthermore, the image forming apparatus 1 has a body housing 50 as an example of a housing having an opening and housing each configuration portion such as the image forming portion 10.

Image Forming Portion 10

The image forming portion 10 includes four image forming units 11Y, 11M, 11C, and 11K disposed in parallel at regular intervals. Each of the image forming units 11Y, 11M, 11C, and 11K includes a photoconductive drum 12 that holds a toner image by forming an electrostatic latent image and forms the toner image by a so-called electrophotographic system.

Each of the image forming units 11Y, 11M, 11C, and 11K forms each toner image of yellow (Y), magenta (M), cyan (C), and black (K).

In addition, the image forming portion 10 includes an intermediate transfer belt 13 that transfers the toner image of each color formed on the photoconductive drum 12 of each image forming unit 11. In addition, the image forming portion 10 includes a primary transfer roll 14 that sequentially transfers (primarily transfers) the toner image of each color formed in each image forming unit 11 to the intermediate transfer belt 13.

Furthermore, the image forming portion 10 includes a secondary transfer portion 15 that collectively transfers (secondarily transfers) the toner image of each color formed on the intermediate transfer belt 13 to a sheet S that is a recording material (recording paper) by being overlapped and a fixing portion 16 that fixes the toner image of each color that is secondarily transferred to the sheet S.

Sheet Supply Portion 30

In the exemplary embodiment, the sheet supply portion 30 is configured to include sheet housing portions (three in the illustrated example) that supplies the sheet S from a sheet bundle housed in a loading portion 351 (described below).

The sheet supply portion 30 supplies the sheet S fed from each sheet housing portion to the sheet transport system 40. In addition, details of the sheet supply portion 30 will be described later.

Sheet Transport System 40

The sheet transport system 40 has a transporting path 41, a handling roll 42, a registration roll 43, and a reversal transporting path 44.

The transporting path 41 is a path that discharges the sheet S from the sheet supply portion 30 to the outside of the body housing 50 through the secondary transfer portion 15 and the fixing portion 16.

The handling roll 42 handles and transports the sheets S fed to a feed roll 34 one by one.

The registration roll 43 supplies the sheet S while performing registration adjustment with respect to the secondary transfer portion 15 by performing rotation at a timing that is set in advance to temporarily stop the transport of the sheet S in a state where the rotation is stopped.

The reversal transporting path 44 forms a path that supplies the sheet S to the secondary transfer portion 15 again by reversing the front and back of the sheet S passing through the fixing portion 16.

Sheet Supply Portion 30

Figure 2:
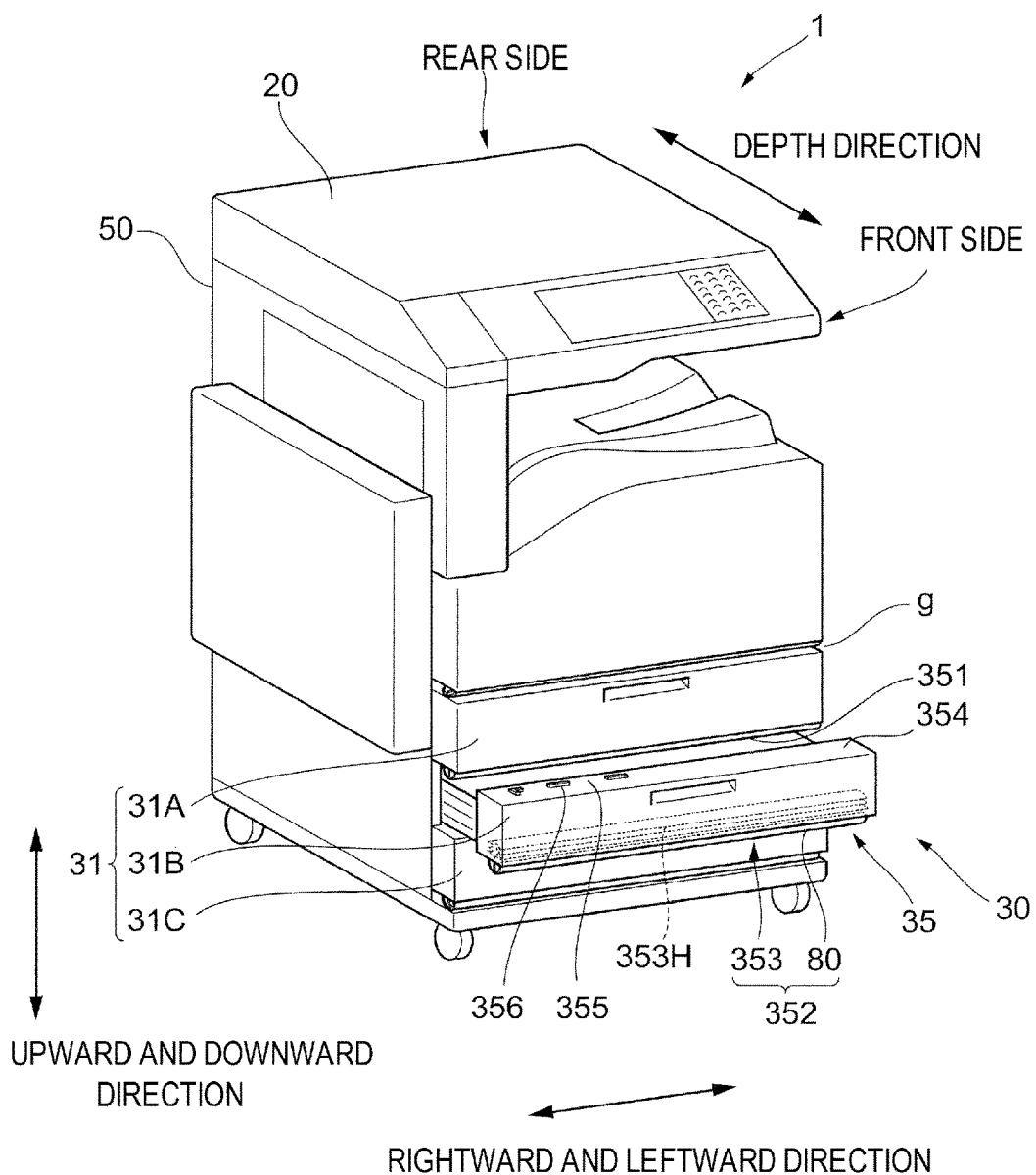
FIG. 2 is a view describing a sheet supply portion in detail in the exemplary embodiment.

FIG. 2 is a view describing the sheet supply portion 30 in detail in the exemplary embodiment.

Next, the sheet supply portion 30 in the exemplary embodiment will be described in detail with reference to FIGS. 1 and 2.

In the exemplary embodiment, the sheet supply portion 30 includes a first sheet housing portion 31A, a second sheet housing portion 31B, and a third sheet housing portion 31C which supply the sheets S from the sheet bundles housed in the loading portion 351 (described below).

As illustrated in FIGS. 1 and 2, the first sheet housing portion 31A, the second sheet housing portion 31B, and the third sheet housing portion 31C are provided in an upward and downward direction of the body housing 50.

In addition, a gap g is formed between a lower-side surface and an upper-side surface of each sheet housing portion 31 facing each other. In addition, each gap g is also formed between the body housing 50 and the upper-side surface of the first sheet housing portion 31A, and between the lower-side surface of the third sheet housing portion 31C and the body housing 50.

Moreover, in the following description, in a case where the first sheet housing portion 31A, the second sheet housing portion 31B, and the third sheet housing portion 31C are not particularly distinguished, it is collectively referred to as the sheet housing portion 31.

Sheet Housing Portion 31

As illustrated in FIG. 1, the sheet housing portion 31 includes a pull-out portion 35 that houses a bundle of the sheets S and is able to be pulled or pushed against the body housing 50 and the feed roll 34 that feeds the uppermost sheet S in the bundle of the sheets S housed in the pull-out portion 35.

Moreover, in the following description, in a case where the pull-out portion 35 is described corresponding to each sheet housing portion 31, it is referred to as a first pull-out portion 35A, a second pull-out portion 35B, and a third pull-out portion 35C.

Moreover, in the following description, a front side of a paper surface is referred to as a "front side" and a rear side of a paper surface of the image forming apparatus 1 illustrated in FIG. 2 is referred to as a "rear side". In addition, a depth direction of the image forming apparatus 1 illustrated in FIG. 2 is simply referred to as the "depth direction", a rightward and leftward direction of the image forming apparatus 1 illustrated in FIG. 2 is simply referred to as a "rightward and leftward direction", and an upward and downward direction of the image forming apparatus 1 illustrated in FIG. 2 is simply referred to as the "upward and downward direction".

Pull-Out Portion 35

Figure 3A:
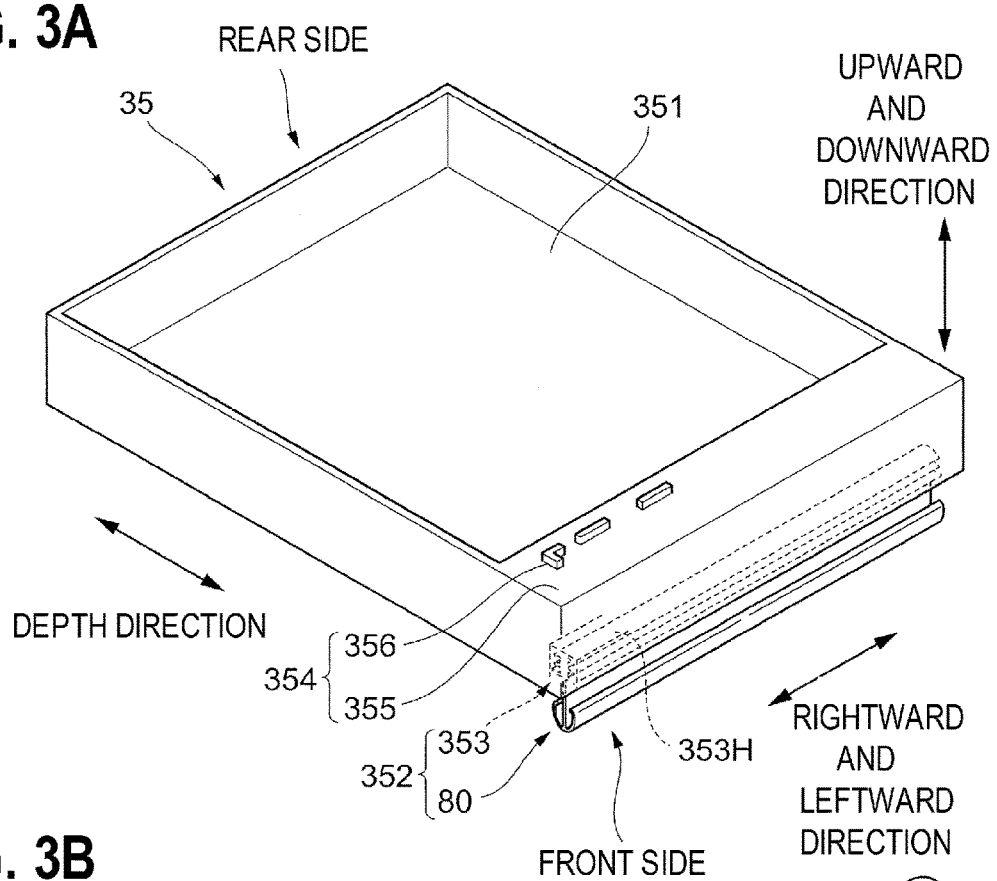
Figure 3B:
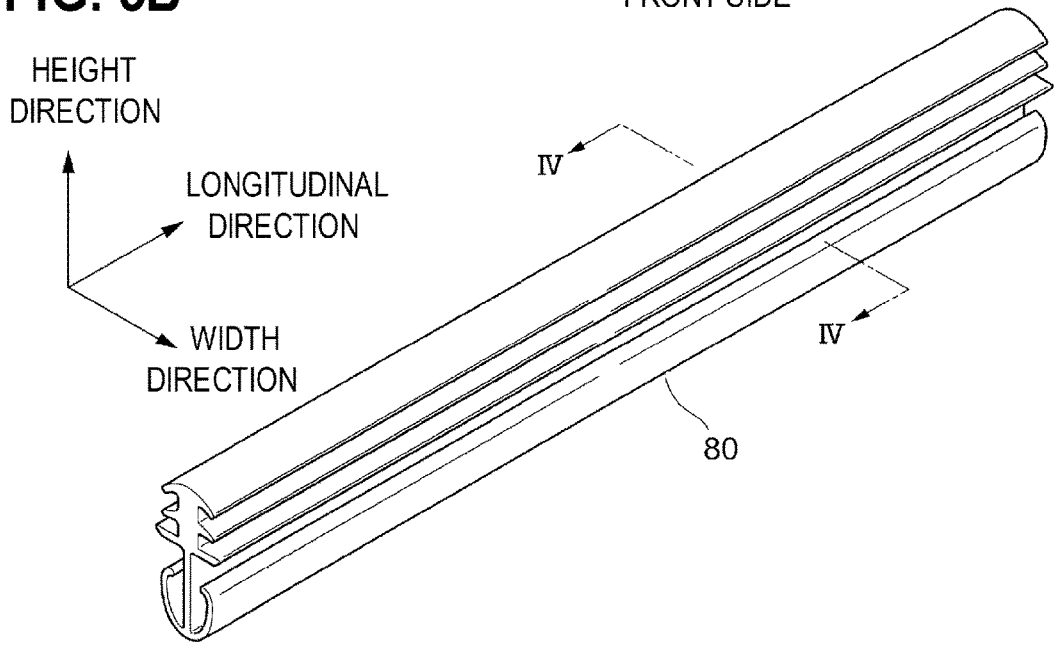

FIGS. 3A and 3B are views describing the pull-out portion 35 in detail in the exemplary embodiment, of which FIG. 3A is a view describing a contacted portion 354 of the pull-out portion 35, and FIG. 3B is a view describing an entire configuration of a gasket 80 of a pull-out sealing portion 352.

Next, the pull-out portion 35 in the exemplary embodiment will be described with reference to FIGS. 3A and 3B. As illustrated in FIG. 3A, the pull-out portion 35 as an example of the opening and closing member has the loading portion 351, the pull-out sealing portion 352, and the contacted portion 354.

The loading portion 351 is a region in which the bundle of the sheets S is loaded.

The loading portion 351 of the illustrated example has a recessed shape. As illustrated in FIGS. 3A and 3B, the pull-out sealing portion 352 includes the gasket 80 as an example of the sealing member and a gasket holding portion 353 that holds the gasket 80. In addition, the pull-out sealing portion 352 is formed on the front side of the lower-side surface of the pull-out portion 35.

Then, the pull-out sealing portion 352 is configured by inserting the gasket 80 into the gasket holding portion 353.

In the illustrated example, the gasket 80 is an elongated member and is configured of, for example, rubber. A length of the gasket 80 is shorter than a width (dimension in the rightward and leftward direction) of the pull-out portion 35.

In addition, in the exemplary embodiment, the gasket 80 is provided in the pull-out portion 35 of each sheet housing portion 31.

Furthermore, the gasket 80 is also provided in a portion facing the first sheet housing portion 31A of the body housing 50 to seal the gap between the body housing 50 and an upper side of the first sheet housing portion 31A.

Then, in the exemplary embodiment, the gasket 80 reduces leakage of operation sound (impact sound) and the like of, for example, the image forming portion 10 positioned on the inside of the body housing 50 to the outside. In other words, leakage of the sound of the inside of the body housing 50 from the body housing 50 to the front side is reduced. Moreover, the gasket 80 will be described later in detail.

As illustrated in FIG. 3A, the gasket holding portion 353 is a substantially linear groove provided along the rightward and leftward direction of the pull-out portion 35. The gasket holding portion 353 is formed by cutting in a lower side surface on the front side of the pull-out portion 35.

In addition, a length of the gasket holding portion 353 is shorter than a length of the pull-out portion 35 and is substantially the same as a length of the gasket 80.

The gasket holding portion 353 is formed in the pull-out portion 35 corresponding to a portion in which the gasket 80 is provided. In the exemplary embodiment, the gasket holding portion 353 is configured of a holding groove 353H of which a cross section is a recessed shape.

Then, the gasket holding portion 353 holds the gasket 80 by inserting a part of the gasket 80 into the holding groove 353H.

As illustrated in FIG. 3A, the contacted portion 354 is configured to include a flat portion 355 formed in a planar shape and a rib 356 protruding from the flat portion 355.

Then, the flat portion 355 and the rib 356 contact with the gasket 80 when the pull-out portion 35 is opened and closed, and when the pull-out portion 35 is provided in a position that is set in advance in which the sheet is able to be supplied on the inside of the body housing 50 (see FIGS. 1 and 2).

Here, the flat portion 355 in the illustrated example is formed in a position contacting with the gasket 80 in a state where the pull-out portion 35 is disposed on the inside of the body housing 50. In addition, a length of the flat portion 355 in the rightward and leftward direction is longer than the length of the gasket 80 contacting with the flat portion 355.

In addition, in the illustrated example, the rib 356 is formed in a position contacting with the gasket 80 when the pull-out portion 35 is pulled out from the body housing 50 or is inserted into the body housing 50. That is, the rib 356 is provided within a passing region of the gasket 80.

Moreover, in the illustrated example, the rib 356 is formed in a position that does not contact with the gasket 80 in a state where the pull-out portion 35 is provided on the inside of the body housing 50. Therefore, the contact between the flat portion 355 and the gasket 80 is ensured, and it is possible to reduce sound leakage to the outside of the body housing 50.

Moreover, although not illustrated, for example, a seal (label), in which loading procedures (operation guides) of the sheet to the pull-out portion 35 and the like are printed, is attached to the flat portion 355. Then, the rib 356 is provided in a position along an end portion of the seal so as to guide the attachment of the seal during manufacturing.

Gasket 80

Figure 4:
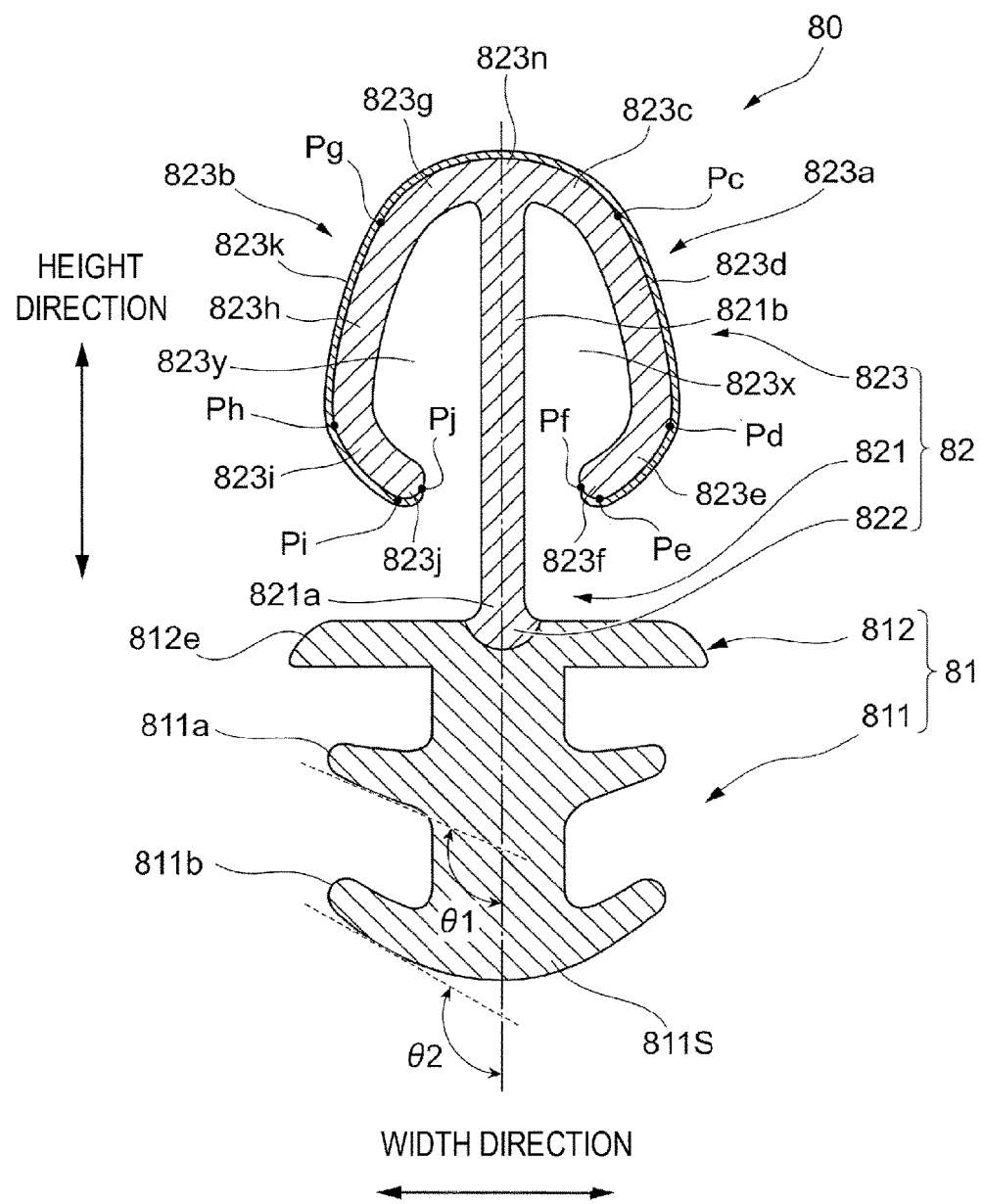
FIG. 4 is a sectional view of the gasket in the exemplary embodiment.

FIG. 4 is a sectional view of the gasket 80 in the exemplary embodiment which is taken along line IV-IV of FIG. 3B.

Moreover, in a state where the gasket 80 is not subjected to stress in the following description, a longitudinal direction of the gasket 80 is simply referred to as the "longitudinal direction", a width direction in a cross section orthogonal to the longitudinal direction is simply referred to as the "width direction", and a height direction in the cross section orthogonal to the longitudinal direction is simply referred to as the "height direction". In addition, in a state where the gasket 80 is mounted on the holding groove 353H of the gasket holding portion 353, the "height direction" is consistent with the "upward and downward direction", the "longitudinal direction" is consistent with the "rightward and leftward direction", and the "width direction" is consistent with the "depth direction".

As illustrated in FIG. 4, the gasket 80 as an example of the sealing member is configured to include a connecting portion 81 as an example of a mounting portion connecting to the holding groove 353H (see FIG. 2) of the gasket holding portion 353 and a sealing portion 82 as an example of an extension portion and a contact portion which contacts with the body housing 50 (see FIG. 2) of a sealing object for closing a gap. In the exemplary embodiment, the connecting portion 81 and the sealing portion 82 are integrally configured.

The connecting portion 81 and the sealing portion 82 are, for example, configured of rubber. In addition, hardness of the rubber of the sealing portion 82 is lower than that of the connecting portion 81. For example, the hardness of the connecting portion 81 is substantially 80° and the hardness of the sealing portion 82 is substantially 40°.

Connecting Portion 81

The connecting portion 81 as an example of the mounting portion includes an inserting portion 811 that is inserted into the holding groove 353H to be fixed and a foundation portion 812 that limits an inserting depth of the inserting portion 811.

The inserting portion 811 includes a shaft portion 811S, a first protrusion portion 811a provided in the shaft portion 811S, and a second protrusion portion 811b provided in the shaft portion 811S.

The first protrusion portion 811a is disposed between the second protrusion portion 811b and the foundation portion 812 (described later) in the height direction. The first protrusion portion 811a is configured of a pair of convex portions protruding from the shaft portion 811S.

Then, a width between tip portions of the first protrusion portion 811a is wider than the width of the holding groove 353H (see FIG. 3A) of the gasket holding portion 353. Furthermore, as illustrated in FIG. 4, each first protrusion portion 811a forms an angle θ1 that is set in advance with respect to the shaft portion 811S.

The second protrusion portion 811b is positioned in an end portion on a side opposite to the sealing portion 82 in the gasket 80. Similar to the first protrusion portion 811a, the second protrusion portion 811b is configured of a pair of convex portions protruding from the shaft portion 811S. A width between tip portions of the second protrusion portion 811b is wider than the width of the holding groove 353H.

Then, as illustrated in FIG. 4, each second protrusion portion 811b forms an angle θ2 that is set in advance with respect to the shaft portion 811S. In the exemplary embodiment, the angle θ2 of the second protrusion portion 811b with respect to the shaft portion 811S is greater than the angle θ1 of the first protrusion portion 811a with respect to the shaft portion 811S.

The foundation portion 812 is formed to have a width greater than that of the holding groove 353H (see FIG. 3A) of the gasket holding portion 353. The foundation portion 812 is formed to extend in a direction crossing the shaft portion 811S.

Then, the foundation portion 812 is caught on an edge of the holding groove 353H so that the inserting portion 811 is stayed in a state of being inserted into a depth which is set in advance with respect to the holding groove 353H (see FIGS. 5A to 5C described below). Furthermore, the foundation portion 812 supports the sealing portion 82 so that the sealing portion 82 rises in a shape which is set in advance in a state where the gasket 80 is mounted on the holding groove 353H.

In addition, an end portion 812e of the foundation portion 812 is formed such that a cross section is tapered. Specifically, the end portion 812e is configured such that a thickness is gradually thinned toward the outside. Therefore, for example, in a case where the foundation portion 812 is subjected to contact with another pull-out portion 35, the gasket 80 is prevented from being removed by the other pull-out portion 35 caught to the foundation portion 812.

Sealing Portion 82

The sealing portion 82 as an example of the extension portion includes a raised portion 821 as an example of the expansion portion, a base portion 822 that connects the raised portion 821 to the connecting portion 81, and a slide portion 823 as an example of an assist portion and a branch portion sealing a gap by contacting with the contacted portion 354. Moreover, the raised portion 821, the base portion 822, and the slide portion 823 are integrally formed.

The raised portion 821 is a thin elongated member and is, for example, formed in a substantially rectangular shape of which a longitudinal direction is the height direction in the cross section illustrated in FIG. 4. A raised base-end portion 821a that is one end of the raised portion 821 in the height direction is connected to the base portion 822 and a raised tip portion 821b that is the other end in the height direction linearly extends in a direction away from the foundation portion 812.

The base portion 822 is formed to have a length in the width direction greater than that of the raised portion 821. In addition, the base portion 822 is formed to be embedded in the height direction of the shaft portion 811S of the connecting portion 81.

The slide portion 823 as an example of the assist portion is a bent planar member and is a plate member having a substantially uniform thickness. In the example illustrated in FIG. 4, the thickness of the slide portion 823 is substantially the same as the thickness (width) of the raised portion 821. In addition, the length of the slide portion 823 in the height direction is shorter than that of the raised portion 821.

Moreover, the slide portion 823 has a protection layer 823k as an example of a low-friction portion on an outer peripheral surface. The protection layer 823k is formed of, for example, Subeappu (registered trademark). The protection layer 823k is configured such that friction generated between the protection layer 823k and the contacted portion 354 is reduced compared to a portion that is not covered by the protection layer 823k. Moreover, in the following description and in FIGS. 5A to 5C and FIGS. 7A to 7D, mention and display of the protection layer 823k are omitted.

Here, the slide portion 823 is formed substantially in a U-shape in a cross section illustrated in FIG. 4. That is, the slide portion 823 has a curved surface protruding in a direction opposite to the connecting portion 81.

In addition, an inside of the curved surface of the slide portion 823 is supported by the raised portion 821. The curved surface in the slide portion 823 is formed to have a dimension in the width direction greater than that of the raised portion 821.

The illustrated slide portion 823 includes a first slide portion 823a as an example of a first assist portion and a second slide portion 823b as an example of a second assist portion which are positioned so as to interpose the raised portion 821 therebetween in the width direction.

The first slide portion 823a and the second slide portion 823b have a symmetric shape relative to a center line of the raised portion 821 in the width direction. Each one end of the first slide portion 823a and the second slide portion 823b is continuous in a tip portion 823n.

In addition, the first slide portion 823a and the second slide portion 823b respectively have a first rear-end portion 823f and a second rear-end portion 823j which are the other ends thereof.

Moreover, the illustrated tip portion 823n is curved. In addition, the tip portion 823n is on the center line of the raised portion 821 in the width direction in a state where the tip portion 823n is not subjected to stress.

Here, the first rear-end portion 823f of the first slide portion 823a and the second rear-end portion 823j of the second slide portion 823b are configured so as to be respectively separated from the raised portion 821.

Additionally, the first slide portion 823a forms a space 823x of a reference numeral between the first slide portion 823a and the raised portion 821, and the second slide portion 823b forms a space 823y of a reference numeral between the second slide portion 823b and the raised portion 821. The space 823x or the space 823y is an example of a space interposed between the first portion and the second portion.

Here, the first slide portion 823a has portions having curvature radiuses of different from each other.

In the example of the cross section illustrated in FIG. 4, the first slide portion 823a has a first tip slide portion 823c having a first curvature radius R1 as an example of a first spring-up portion and a first bent portion, a first center slide portion 823d having a second curvature radius R2, and a first rear-end slide portion 823e having a third curvature radius R3 as an example of a second spring-up portion and a second bent portion in this order from the tip portion 823n to the first rear-end portion 823f.

In the example of the cross section illustrated in FIG. 4, for example, a relationship of the second curvature radius R2>the first curvature radius R1>the third curvature radius R3 is satisfied.

Inflection points on an outer peripheral surface of the first slide portion 823a are respectively an inflection point Pc, an inflection point Pd, and an inflection point Pe in this order from the tip portion 823n to the first rear-end portion 823f. In addition, a direction from the tip portion 823n to the inflection point Pd is a direction away from the raised portion 821 and a direction from the inflection point Pd to the first rear-end portion 823f is a direction approaching the raised portion 821.

Similar to the first slide portion 823a, the second slide portion 823b has regions of plural curvature radiuses. That is, the second slide portion 823b has a second tip slide portion 823g, a second center slide portion 823h, and a second rear-end slide portion 823i, and the second rear-end portion 823j in this order from the tip portion 823n to the second rear-end portion 823j.

In the example of the cross section illustrated in FIG. 4, inflection points on an outer peripheral surface of the second slide portion 823b are respectively an inflection point Pg, an inflection point Ph, and an inflection point Pi in this order from the tip portion 823n to the second rear-end portion 823j. In addition, a direction from the tip portion 823n to the inflection point Ph is a direction away from the raised portion 821 and a direction from the inflection point Ph to the second rear-end portion 823j is a direction approaching the raised portion 821.

Sealing Operation of Gasket 80

FIGS. 5A to 6E are views describing a sealing operation of the gasket 80 in the exemplary embodiment. FIGS. 5A to 5C, FIGS. 5D and 5E are views describing the sealing operation in the pushing process of the first pull-out portion 35A. FIGS. 6A to 6C, FIGS. 6D and 6E are views describing the sealing operation of a pulling process of the first pull-out portion 35A.

Sequentially, the sealing operation of the gasket 80 in the exemplary embodiment will be described. Moreover, in the following description, an example, in which the gasket 80 seals the gap g formed between the first pull-out portion 35A and the second pull-out portion 35B (see FIG. 2), will be described.

First, the gasket 80 is mounted on the holding groove 353H of the first pull-out portion 35A. In this case, the first slide portion 823a of the gasket 80 is directed on the rear side and the second slide portion 823b is directed on the front side.

In addition, if the gasket 80 is mounted on the holding groove 353H and is in a free state in which the gasket 80 is not subjected to the stress, a length of a portion of the gasket 80 protruding from the holding groove 353H is longer than the gap g in the upward and downward direction.

Therefore, the gasket 80 is in a state of being pressed and deformed between the first pull-out portion 35A and the second pull-out portion 35B in a state where both the first pull-out portion 35A and the second pull-out portion 35B are housed in the body housing 50.

Therefore, the gap g formed between the first pull-out portion 35A and the second pull-out portion 35B are sealed by the gasket 80.

Here, as described above, the first pull-out portion 35A and the second pull-out portion 35B are respectively able to be pulled out from the body housing 50. Then, in a process in which each of the first pull-out portion 35A and the second pull-out portion 35B is housed in the body housing 50, or in a process in which each thereof is pulled out from the body housing 50, a relative position between the first pull-out portion 35A and the second pull-out portion 35B is changed.

The gasket 80 changes a posture thereof as the relative position is changed. An operation of the gasket 80 will be described in detail later.

Moreover, as modes in which the relative position between the first pull-out portion 35A and the second pull-out portion 35B is changed, for example, the following four modes are provided.

That is, a mode (pushing process of the first pull-out portion 35A) in which the first pull-out portion 35A is housed in the body housing 50 from a state of being pulled out in a state where the second pull-out portion 35B is housed in the body housing 50, a mode (pulling process of the first pull-out portion 35A) in which the first pull-out portion 35A is pulled out from a state of being housed in the body housing 50 in a state where the second pull-out portion 35B is housed in the body housing 50, a mode (pushing process of the second pull-out portion 35B) in which the second pull-out portion 35B is housed in the body housing 50 in a state of being pulled out in a state where the first pull-out portion 35A is housed in the body housing 50, and a mode (pulling process of the second pull-out portion 35B) in which the second pull-out portion 35B is pulled out from a state of being housed in the body housing 50 in a state where the first pull-out portion 35A is housed in the body housing 50 are provided.

Moreover, as a posture of the gasket 80, there are three modes of a free mode in which the gasket 80 is not subjected to an external force and is not curved, a mode in which the convex portion is curved on the front side by receiving the external force, and a mode in which the convex portion is curved on the rear side by receiving the external force.

Then, the operation of the gasket 80 may be different depending on whether the gasket 80 is in any posture in the initial state In the following description, two operations of an operation which is performed by the gasket 80 of the free state in the pushing process (pushing process of the first pull-out portion 35A) of the first pull-out portion 35A and an operation which is performed by the gasket 80 which is belt on the front side in the pulling process (pulling process of the first pull-out portion 35A) of the first pull-out portion 35A will be described in detail.

Moreover, since operation principles of operations by other combinations are the same, the detailed description will be omitted and differences will be mainly described.

Operation of Gasket 80 in Pushing Process of First Pull-Out Portion 35A

First, FIGS. 5A to 5C, FIGS. 5D and 5E are views describing the process in which the first pull-out portion 35A is housed in the body housing 50 from the state where first pull-out portion 35A is pulled out in a state where the second pull-out portion 35B is housed in the body housing 50.

Figure 5A:
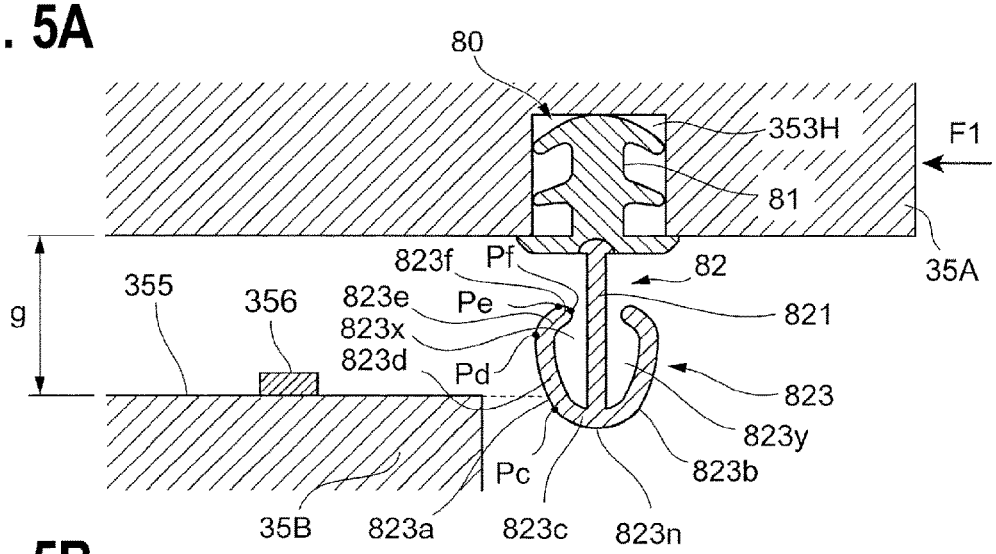
FIGS. 5A to 5C are views describing an operation of the gasket in a pushing process of a first pull-out portion in the exemplary embodiment.

As illustrated in FIG. 5A, in a state where the first pull-out portion 35A is pulled out, the gasket 80 is separated from the flat portion 355 of the second pull-out portion 35B and is in the free state.

Figure 5B:
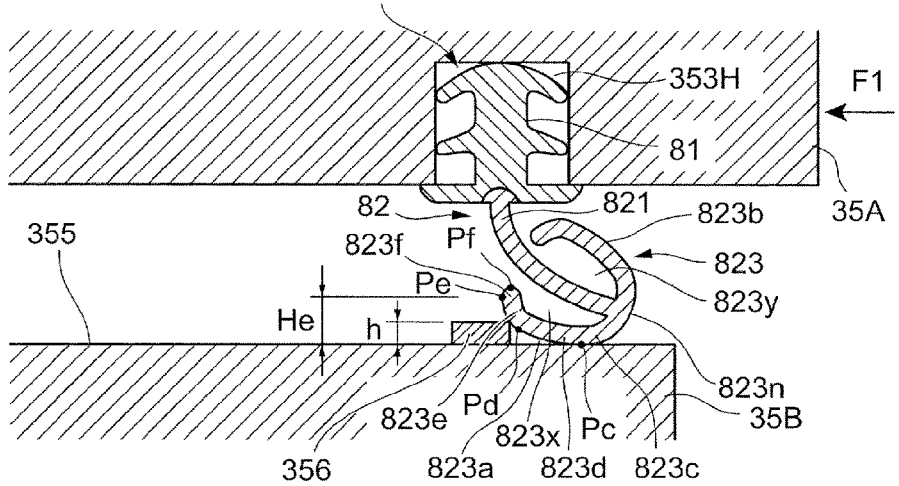

Next, as illustrated in FIG. 5B, if the first pull-out portion 35A is pushed by receiving, for example, a pushing force F1, the gasket 80 is pressed and curved by the second pull-out portion 35B. In the illustrated example, the first slide portion 823a of the gasket 80 is pressed by the flat portion 355 of the second pull-out portion 35B.

In this case, the first center slide portion 823d of the first slide portion 823a abuts against an edge of the second pull-out portion 35B on the front side and the sealing portion 82 of the gasket 80 is fallen down on the front side. Then, the first center slide portion 823d contacts with the flat portion 355. Therefore, the first rear-end portion 823f of the sealing portion 82 of the first pull-out portion 35A is in a state of being directed to the rib 356 of the second pull-out portion 35B.

Moreover, in the state, the space 823x and the space 823y of the sealing portion 82 have the substantially same shape as each other.

Next, as the first pull-out portion 35A is further pushed, the sealing portion 82 approaches the rib 356 of the second pull-out portion 35B while the first center slide portion 823d maintains a state of being in contact with the flat portion 355.

Figure 5C:
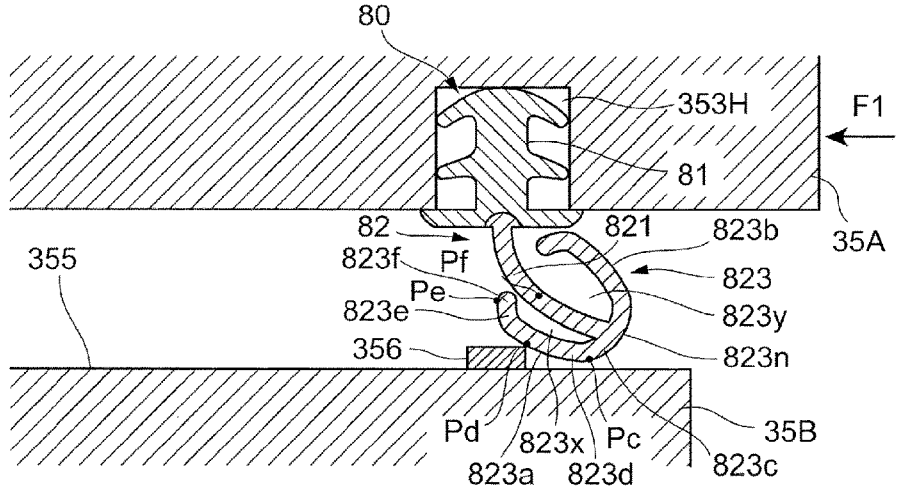

Then, as illustrated in FIG. 5C, the first rear-end slide portion 823e contacts with the rib 356. In this case, the gasket 80 (the sealing portion 82) rides on the rib 356 using the outer peripheral surface of the first rear-end slide portion 823e.

That is, an inclined surface of the first rear-end slide portion 823e is pressed against the rib 356 and thereby the tip of the sealing portion 82 moves upward. In other words, the gasket 80 springs up in a position in which the gasket 80 abuts against the rib 356.

In this case, the first slide portion 823a is pressed by the rib 356 and the space 823x is smaller than the space 823y. Therefore, the length of the sealing portion 82 in the upward and downward direction is shortened. Then, the gasket 80 passes through a gap between the upper end surface of the rib 356 and the lower surface of the first sheet housing portion 31A while maintaining the state.

Moreover, in the process, sealing of the gap g is held by being in contact between the first rear-end slide portion 823e and the rib 356.

Figure 5D:
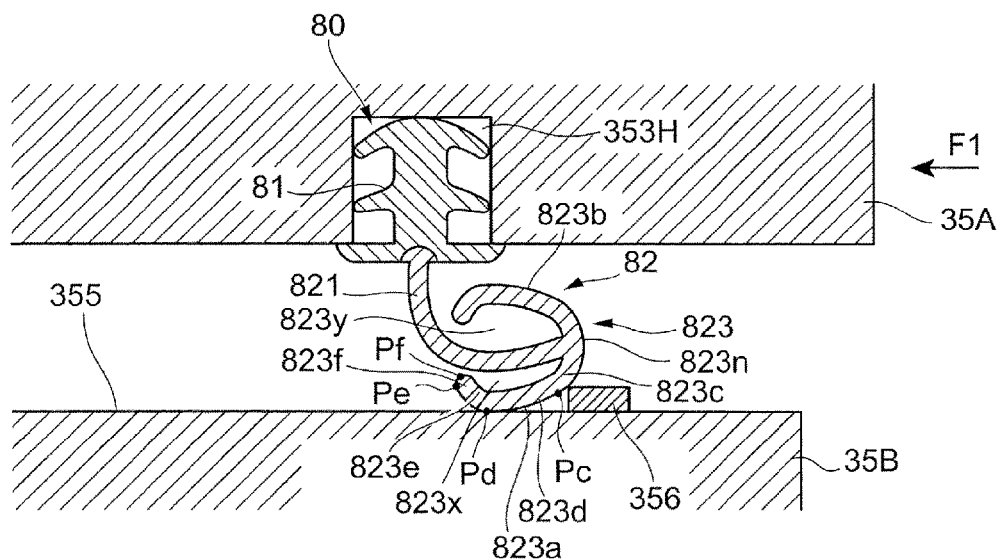
FIGS. 5D and 5E are views describing the operation of the gasket in the pushing process of the first pull-out portion in the exemplary embodiment.

Next, as illustrated in FIG. 5D, the sealing portion 82 passes through (rides over) the rib 356. In this case, the position of the portion contacting with the rib 356 is shifted and the first tip slide portion 823c of the sealing portion 82 is in a state of being in contact with the rib 356 from a state where the first rear-end slide portion 823e of the sealing portion 82 contacts with the rib 356.

In this case, the first rear-end slide portion 823e of the sealing portion 82 descends from the upper end surface of the rib 356. Then, the small space 823x is increased again and approaches the size of the space 823y.

Moreover, in the process, sealing of the gap g is held by the contact between the first tip slide portion 823c and the rib 356.

Figure 5E:
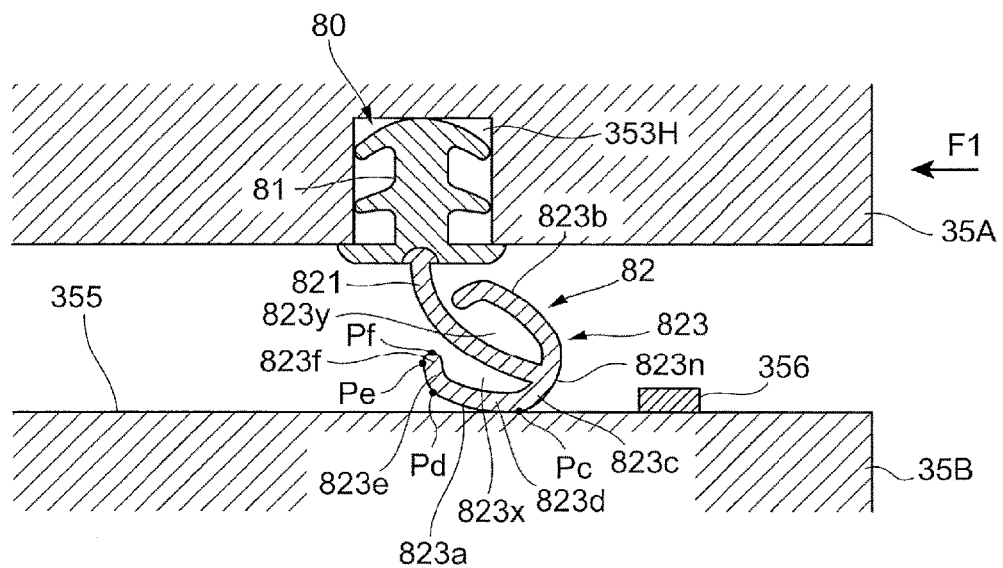

Next, as illustrated in FIG. 5E, the first center slide portion 823d is moved along the flat portion 355 while being in contact with the flat portion 355 again and is stopped in a position which is set in advance.

In addition, in the process, sealing of the gap g is held by the contact between the first center slide portion 823d and the flat portion 355 of the second pull-out portion 35B.

As described in FIG. 5C, when the gasket 80 of the exemplary embodiment passes through the rib 356 while being pressed against the flat portion 355, the first rear-end slide portion 823e contacting with the rib 356.

That is, the curved surface (inclined surface) of the gasket 80 abuts against the rib 356. Furthermore, the curved surface (inclined surface) is curved (inclined) in a direction away from the flat portion 355 as the curved surface (inclined surface) proceeds on a downstream side in a traveling direction of the gasket 80.

Here, in the example illustrated in FIG. 5B, a height He from the inflection point Pe of the sealing portion 82 of the first pull-out portion 35A to the flat portion 355 is higher than a height h from the flat portion 355 of the second pull-out portion 35B to the rib 356.

Therefore, when of the sealing portion 82 of the first pull-out portion 35A abuts against the rib 356, the abutting position is between the inflection point Pe and the inflection point Pd, that is, the outer peripheral surface of the first rear-end slide portion 823e.

Operation of Gasket 80 in Pulling Process of First Pull-Out Portion 35A

Next, as illustrated in FIGS. 6A to 6C, FIGS. 6D and 6E, the pulling process of the first pull-out portion 35A, that is, a process in which the first pull-out portion 35A and the second pull-out portion 35B are housed in the body housing 50, and the first pull-out portion 35A is pulled out from the body housing 50 will be described.

Figure 6A:
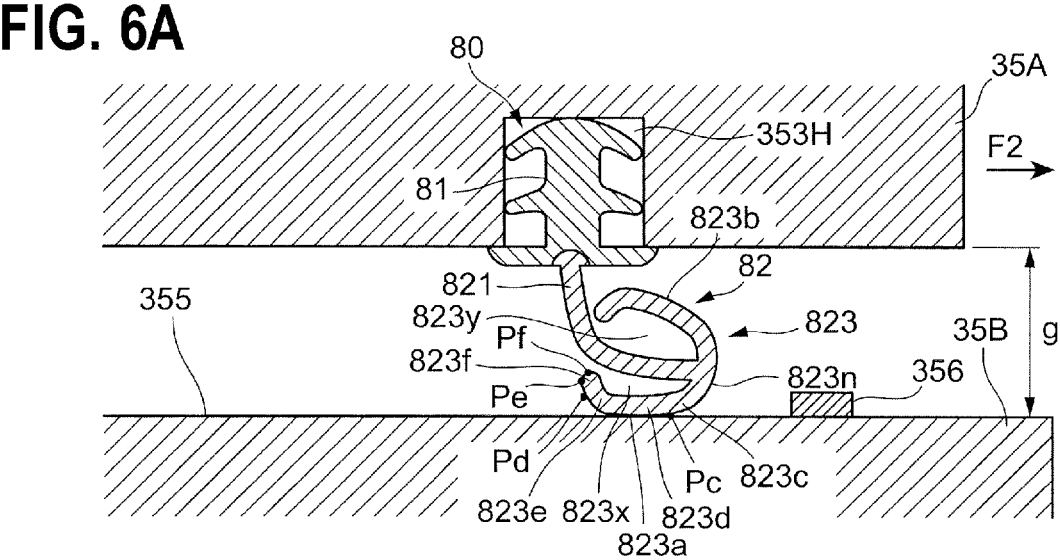
FIGS. 6A to 6C are views describing an operation of the gasket in a pull-out process of the first pull-out portion in the exemplary embodiment.

First, as illustrated in FIG. 6A, in an initial state, the gasket 80 is curved on the front side. That is, the first center slide portion 823d of the gasket 80 contacts with the flat portion 355 of the second sheet housing portion 31B and the tip portion 823n is in a state of being directed on the front side. In addition, the rib 356 of the second pull-out portion 35B is positioned on the front side of the gasket 80 of the first pull-out portion 35A.

Figure 6B:
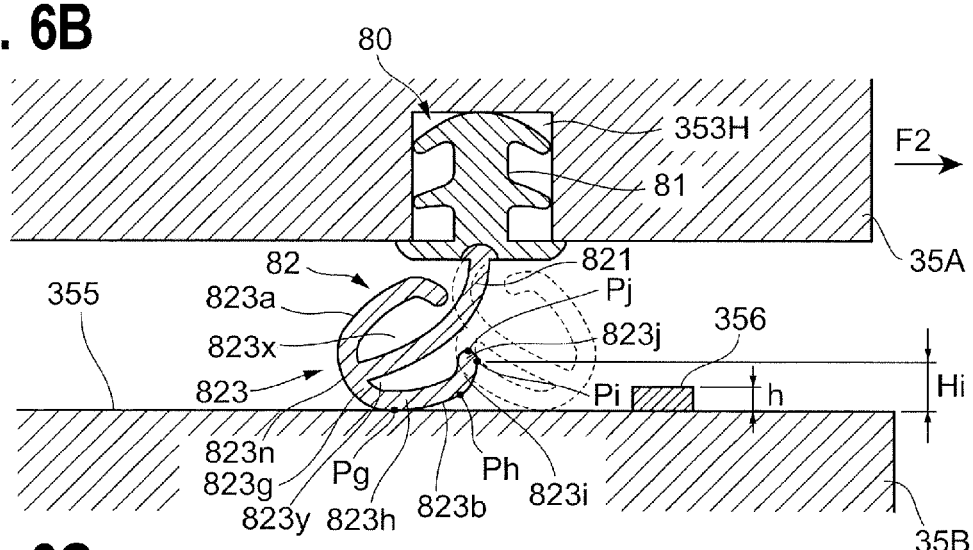

Next, as illustrated in FIG. 6B, if the first pull-out portion 35A is pulled out by, for example, a pull-out force F2, the connecting portion 81 is moved on the front side. On the other hand, since the first center slide portion 823d contacts with the flat portion 355 of the second sheet housing portion 31B, the sealing portion 82 receives a resistance force. Therefore, the tip portion 823n is in a state of being directed on the rear side.

More specifically, the direction of the curve of the raised portion 821 is changed and the tip portion 823n of the raised portion 821 is changed from a state of being directed on the front side to a state of being directed on the rear side.

In this case, the slide portion 823 is rotated and a portion being in contact with the flat portion 355 is changed. That is, the portion being in contact with the flat portion 355 is changed from the first center slide portion 823d to the second center slide portion 823h via the tip portion 823n. Then, the second rear-end portion 823j of the sealing portion 82 of the first pull-out portion 35A is in a state of being directed to the rib 356 of the second pull-out portion 35B.

Next, as the first pull-out portion 35A is further pulled out, the sealing portion 82 approaches the rib 356 of the second pull-out portion 35B while a state where the second center slide portion 823h contacts with the flat portion 355 is maintained.

Figure 6C:
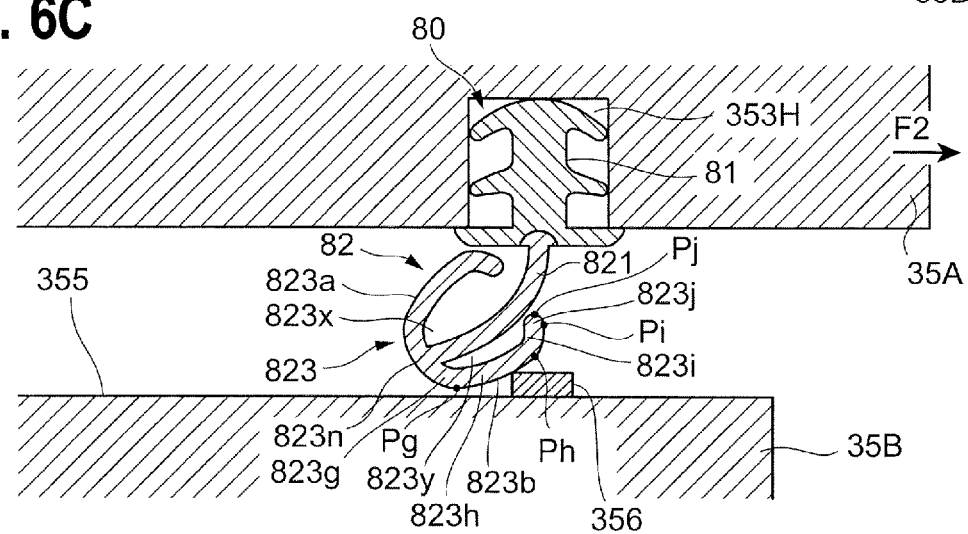
Figure 6D:
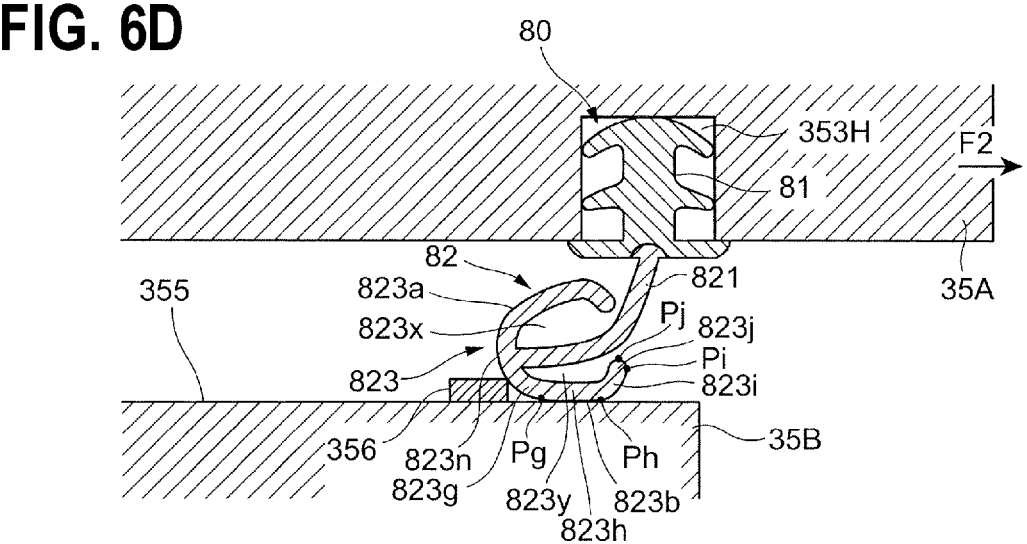
FIGS. 6D and 6E are views describing the operation of the gasket in the pull-out process of the first pull-out portion in the exemplary embodiment.
Figure 6E:
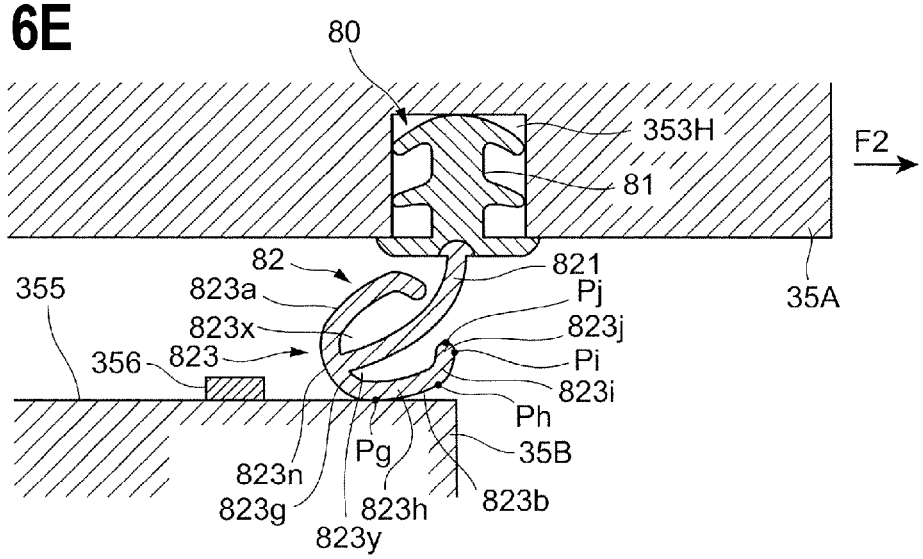

Then, as illustrated in FIGS. 6C to 6E, after the second rear-end slide portion 823i contacts with the rib 356, the sealing portion 82 passes through the rib 356 while the gasket 80 (sealing portion 82) rides over the rib 356. Moreover, since the process is the same as the process illustrated in FIGS. 5C to 5E described above except that the contact portions are the second rear-end slide portion 823i and the second center slide portion 823h, detailed description will be omitted.

Operation of Gasket 80 in Operating Process by Another Combination

FIGS. 7A to 7D are views describing the operation of the gasket 80 in an operating process by another combination of the exemplary embodiment.

Moreover, as other operating processes, for example, the following two processes will be described briefly.

Figure 7A:
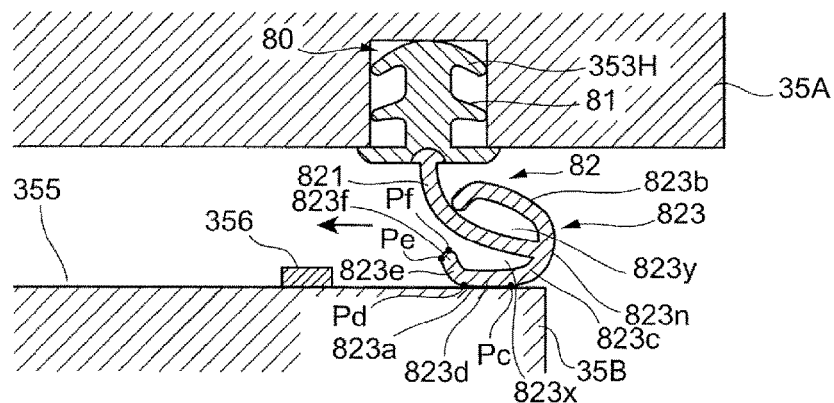
FIGS. 7A to 7D are views describing the operation of the gasket in an operating process by another combination of the exemplary embodiment.
Figure 7B:
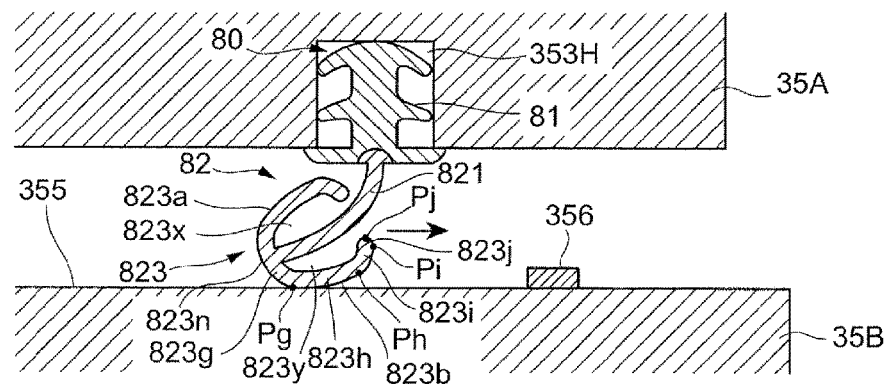

As a first process, as illustrated in FIGS. 7A and 7B, a case where the first rear-end portion 823f and the second rear-end portion 823j are directed to the rib 356 will be described.

As illustrated in FIG. 7A, the first slide portion 823a contacts with the flat portion 355 and the first rear-end portion 823f of the slide portion 823 is moved on a downstream side in the moving direction. In this case, the outer peripheral surface of the first rear-end slide portion 823e is used and the sealing portion 82 rides over the rib 356.

Moreover, the process illustrated in FIG. 7B is different from the example of FIG. 7A in that the second slide portion 823b contacts with the flat portion 355. Then, an outer peripheral surface of the second rear-end slide portion 823i is used and the sealing portion 82 rides over the rib 356.

Figure 7C:
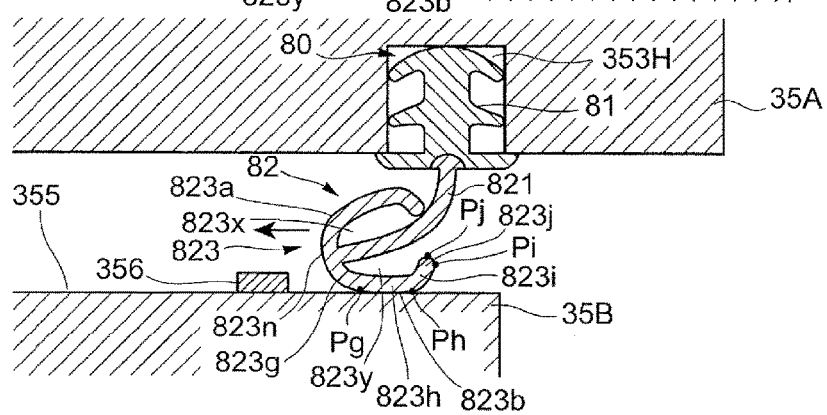
Figure 7D:
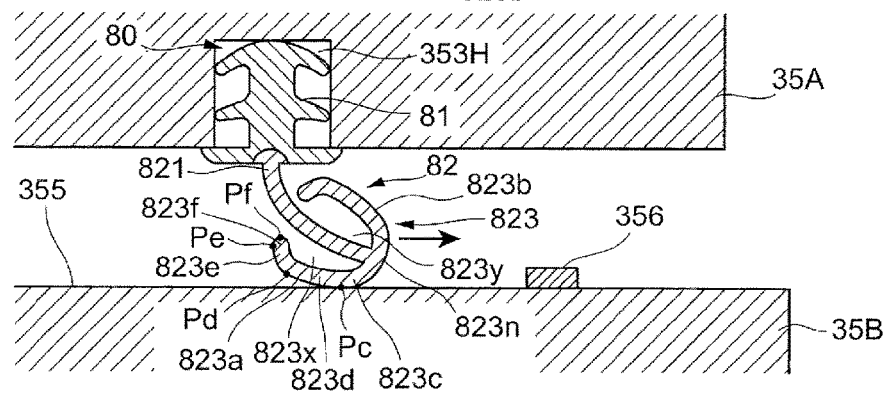

As a second process, as illustrated in FIGS. 7C and 7D, a case where the tip portion 823n is directed to the rib 356 will be described.

As illustrated in FIG. 7C, the second slide portion 823b contacts with the flat portion 355 and the tip portion 823n of the slide portion 823 is moved on the downstream side in the moving direction. In this case, the outer peripheral surface of the second tip slide portion 823g is used and the sealing portion 82 rides over the rib 356.

Moreover, the process illustrated in FIG. 7D is different from the example of FIG. 7C in that the first slide portion 823a contacts with the flat portion 355. Then, the outer peripheral surface of the first tip slide portion 823c is used and the sealing portion 82 rides over the rib 356.

Gasket 90

Figure 8:
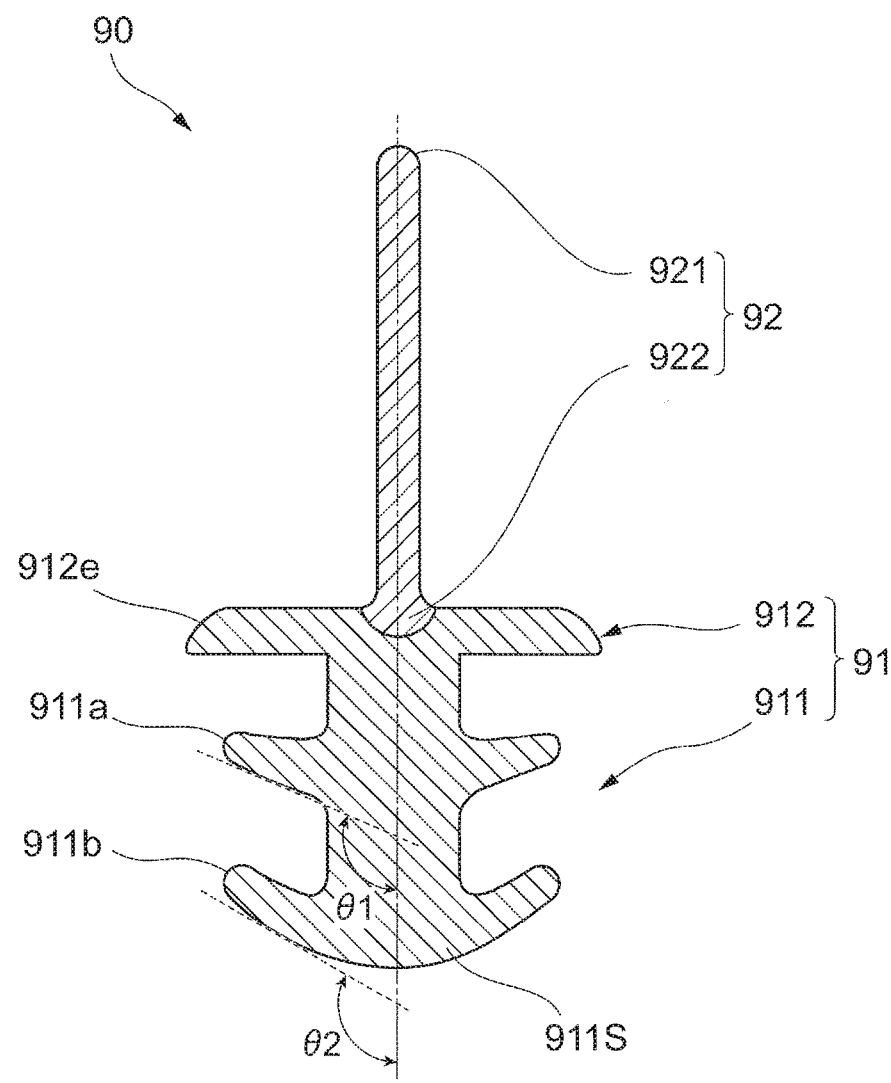
FIG. 8 is a sectional view of a gasket in a comparison example different from the exemplary embodiment.

FIG. 8 is a sectional view of a gasket 90 in a comparison example different from the exemplary embodiment. Moreover, FIG. 8 illustrates a cross section that is cut in a direction crossing a longitudinal direction of the gasket 90.

Next, the gasket 90 that is the comparison example different from the exemplary embodiment will be described with reference to FIG. 8.

The gasket 90 is configured to include a connecting portion 91 that is connected to a holding groove 353H (see FIGS. 2 and 9A to 9E) of a gasket holding portion 353 and a sealing portion 92 that closes a gap by contacting with a body housing 50 (see FIG. 2) of a sealing object.

Here, the sealing portion 92 has a raised portion 921 that is a substantially planar member and rises up to extend in a direction away from a foundation portion 912, and a base portion 922 that connects the sealing portion 92 and the connecting portion 91 in an end portion of the raised portion 921.

Then, the sealing portion 92 is deformed so that the raised portion 921 falls in a direction in which the raised portion 921 is close to the connecting portion 91 thereby sealing a gap with another pull-out portion 35.

The gasket 90 is different from the gasket 80 of the exemplary embodiment described above in that the slide portion 823 is not provided.

As described above, the gasket 90 and the gasket 80 have the different configurations and thereby deforming operations of the gasket 90 and the gasket 80 are different from each other in accordance with a change in a relative position of the first pull-out portion 35A and the second pull-out portion 35B. Hereinafter, the deforming operation will be described.

Operation of Gasket 90

FIGS. 9A to 9E are views describing a sealing operation of the gasket 90 in the comparison example different from the exemplary embodiment.

Moreover, in the following description, a pulling process of the first pull-out portion 35A, that is, a process in which the first pull-out portion 35A and the second pull-out portion 35B are housed in the body housing 50, and the first pull-out portion 35A is pulled out from the body housing 50 will be described.

First, in a free state in which the gasket 90 is mounted on the holding groove 353H and the gasket 90 is not subjected to the stress, a length of a portion of the gasket 90 protruding from the holding groove 353H is longer than the gap g in the upward and downward direction.

Figure 9A:
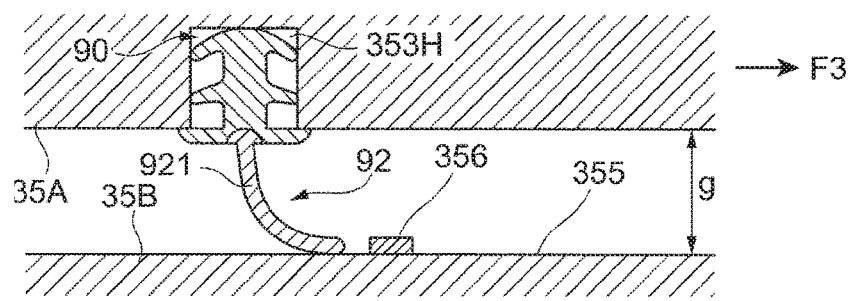
FIGS. 9A to 9E are views describing a sealing operation of the gasket in the comparison example different from the exemplary embodiment.

Then, as illustrated in FIG. 9A, the raised portion 921 of the gasket 90 is pressed by the flat portion 355 of the second pull-out portion 35B and then is curved. In addition, in this case, the gasket 90 is curved on the front side.

Next, as the first pull-out portion 35A is pulled out by, for example, a pull-out force F3, the sealing portion 92 approaches the rib 356 of the second pull-out portion 35B while holding a state where the raised portion 921 contacts with the flat portion 355.

Figure 9B:
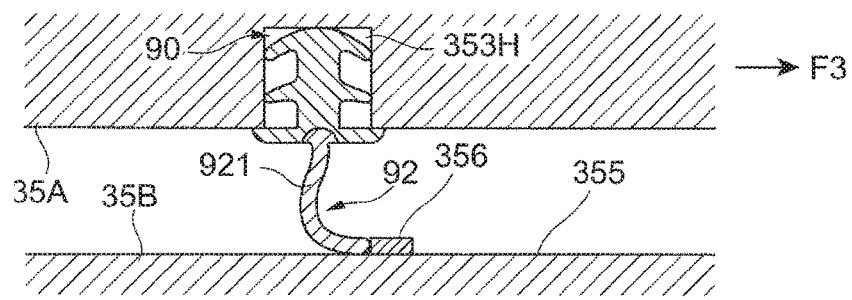

Then, as illustrated in FIG. 9B, when a tip of the raised portion 921 contacts with the rib 356, the tip of the raised portion 921 abuts against the rib 356. Therefore, moving of the tip of the raised portion 921 is stopped by the rib 356. On the other hand, a base end of the raised portion 921 is pulled out by the pull-out force F3.

Figure 9C:
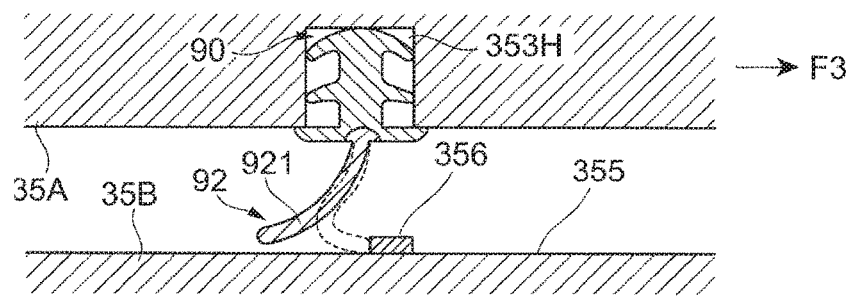

Then, as illustrated in FIG. 9C, if the base end of the raised portion 921 is further pulled out on the front side, the tip of the raised portion 921 is flipped by the rib 356.

More specifically, the direction of the curve of the raised portion 921 is changed and the tip of the raised portion 921 is changed from a state of being directed on the front side to a state of being directed on the rear side. In this case, the raised portion 921 is flipped and changes a portion contacting with the flat portion 355. That is, the portion contacting with the flat portion 355 is an opposite surface of the raised portion 921.

Figure 9D:
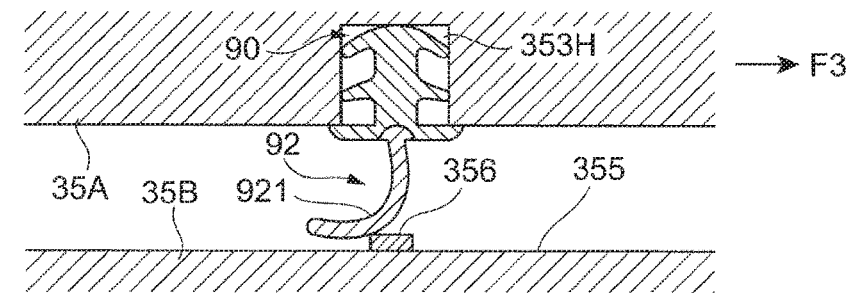
Figure 9E:
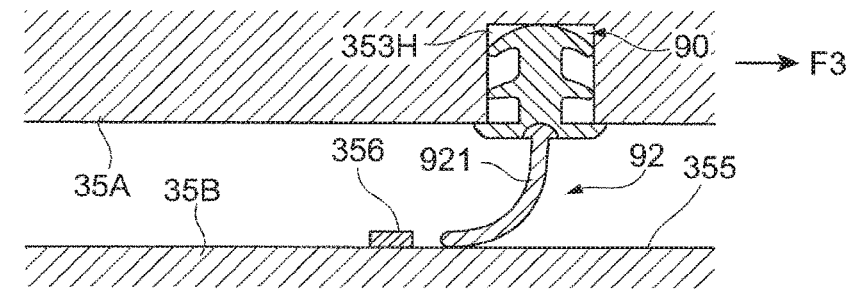

Then, as illustrated in FIG. 9D, the tip of the raised portion 921 contacts with the flat portion 355 again while the tip of the raised portion 921 is in a state of being directed on the rear side.

Comparison Between Exemplary Embodiment and Comparison Example Different From Exemplary Embodiment As illustrated in FIG. 9B, in the comparison example different from the exemplary embodiment, when the gasket 90 contacts with the rib 356, the tip of the raised portion 921 of the gasket 90 abuts against the rib 356. Therefore, a resistance force pulling out the first pull-out portion 35A is increased. In addition, if the first pull-out portion 35A is further pulled out, the tip of the gasket 90 is flipped by the rib 356 and then contacts with the flat portion 355 of the second pull-out portion 35B again. Sound is generated in accordance with the operation in which the tip of the gasket 90 is flipped and contacts with the flat portion 355 of the second pull-out portion 35B (see FIG. 9C).

On the other hand, in the exemplary embodiment, as described above, the curved surface of the gasket 80 abuts against the rib 356. Therefore, the gasket 80 passes through the rib 356 while contacting with the rib 356 and springing up. That is, the increase in the resistance force is suppressed due to abutting against the rib 356 compared to, for example, the gasket 90. Furthermore, in other words, operation feeling is improved. In addition, as described above, the sound due to flipping of the tip of the gasket 90 is suppressed.

Modification Examples

In the above description, the slide portion 823 of the sealing portion 82 is described to have the configuration in which the space 823x and the space 823y are provided in the spaces between the slide portion 823 and the raised portion 821, but, for example, the slide portion 823 of the sealing portion 82 may be configured to have no space between the slide portion 823 and the raised portion 821.

In addition, a shrinkable material may be configured in place of the spaces.

In addition, in the illustrated example, the sealing portion 82 is described to have the symmetrical shape based on the center line of the raised portion 821 in the width direction, but the sealing portion 82 may not be the symmetrical shape, and, for example, the slide portion 823 may be configured to have only one of the first slide portion 823a and the second slide portion 823b.

In addition, in the example described above, the slide portion 823 of the sealing portion 82 is described as the elongated member of which the cross section in the width direction is curved in a substantially U shape, but, for example, the shape of the cross section may be a V shape, round, a polygonal shape such as a pentagonal shape, or the like.

That is, in a state where the surface contacting with the rib is in the inclined surface or a curved surface and the inclined surface or the curved surface is pushed in the gap g, and thereby the sealing portion 82 is curved, it may be configured to have the maximum height to the flat portion 355 to be higher than the height of the rib 356.

In addition, in the example described above, the configuration, in which the first tip slide portion 823c and the second tip slide portion 823g are provided on the front end side and the first rear-end slide portion 823e and the second rear-end slide portion 823i are provided on the rear end side in the first slide portion 823a and the second slide portion 823b of the slide portion 823, is described, but a configuration to have only one of the first tip slide portion 823c and the second tip slide portion 823g in front end or the first rear-end slide portion 823e and the second rear-end slide portion 823i in the rear end may be provided.

In addition, in the gasket 80 of the illustrated example, the slide portion 823 and the raised portion 821 are described to have uniform thicknesses, but, for example, the slide portion 823 and the raised portion 821 may be configured to be not uniform.

In addition, in the example described above, the raised portion 821 is described to be configured of rubber, but, for example, the raised portion 821 may be configured of an elastic body such as spring.

In addition, in the example described above, the configuration, in which the gasket 80 is mounted on the first pull-out portion 35A, that is, the gasket 80 is mounted in a direction from top to bottom, is described, but, for example, a configuration, in which the gasket 80 is mounted on the second pull-out portion 35B, that is, the gasket 80 is mounted in a direction from bottom to top, may be provided.

In addition, in the example described above, in the gasket 80, the hardness of the rubber configuring the connecting portion 81 and the sealing portion 82 is described different, but, for example, the hardness of the connecting portion 81 and the sealing portion 82 may coincide.

In addition, in the sealing portion 82, the slide portion 823 and the raised portion 821 are described to be configured of the same material, but, for example, the slide portion 823 and the raised portion 821 may be configured of different materials.

In addition, in the example described above, the description, in which the protection layer 823k is formed in a part of the surface of the sealing portion 82 of the gasket 80, is provided, but, for example, the protection layer 823k may be formed in an entirety of the sealing portion 82 of the gasket 80 or an entirety of the gasket 80.

In addition, the protection layer 823k is, for example, a thin film and may be formed by a making (three-color molding) process by profile extrusion which is formed in the sealing portion 82 simultaneously with molding of the gasket 80 or a coating process. In addition, the protection layer 823k may not be provided.

In addition, in the example described above, the gasket 80 is described in which one gasket 80 is provided between the first pull-out portion 35A and the second pull-out portion 35B, but plural gaskets 80 may be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image forming member that forms an image on a sheet;
   a housing that has an opening in a position that is set in advance;
   an opening and closing member that is able to open and close the opening of the housing;
   a rib arranged at a flat portion of one member or another member; and
   a sealing member that seals a gap between the one member and the another member, the sealing member comprising:
   a mounting portion that is mounted on the one member; and
   an extension portion that extends from a mounting portion side to another member side and contacts with the other member,
   wherein the extension portion includes an assist portion that is formed in one end toward the other member side and assists spring-up of the extension portion in accordance with sliding of the other member or the one member, and
   wherein the rib contacts with one of the plurality of assist portions when the opening and closing member is opened and the rib contacts with another one of the plurality of assist portions when the opening and closing member is closed.

2. The image forming apparatus according to claim 1, wherein the assist portion includes
   a first portion that is deformed due to being pressed by the other member, and
   a second portion that is provided in a direction in which the first portion is pressed to interpose a space between the first portion and the second portion.

3. The image forming apparatus according to claim 1, wherein the assist portion includes
   a first assist portion that is formed on one side of the other member or the one member in a sliding direction in a state of not contacting with the other member and assists spring-up of the extension portion in accordance with sliding of the other member or the one member, and
   a second assist portion that is formed on the other side of the other member in the sliding direction in a state of not contacting with the other member and assists spring-up of the extension portion in accordance with sliding of the other member or the one member.

4. The image forming apparatus according to claim 2, wherein the assist portion includes
   a first assist portion that is formed on one side of the other member or the one member in a sliding direction in a state of not contacting with the other member and assists spring-up of the extension portion in accordance with sliding of the other member or the one member, and
   a second assist portion that is formed on the other side of the other member in the sliding direction in a state of not contacting with the other member and assists spring-up of the extension portion in accordance with sliding of the other member or the one member.

5. The image forming apparatus according to claim 1, wherein the assist portion includes
   a first spring-up portion that is formed on one side of the other member or the one member in the sliding direction in a state of contacting with the other member and assists the spring-up of the extension portion in accordance with the sliding of the other member or the one member, and
   a second spring-up portion that is formed on the other side in the sliding direction in the state of contacting with the other member and assists the spring-up of the extension portion in accordance with the sliding of the other member or the one member.

6. The image forming apparatus according to claim 2, wherein the assist portion includes
   a first spring-up portion that is formed on one side of the other member or the one member in the sliding direction in a state of contacting with the other member and assists the spring-up of the extension portion in accordance with the sliding of the other member or the one member, and
   a second spring-up portion that is formed on the other side in the sliding direction in the state of contacting with the other member and assists the spring-up of the extension portion in accordance with the sliding of the other member or the one member.

7. The image forming apparatus according to claim 3, wherein the assist portion includes
   a first spring-up portion that is formed on one side of the other member or the one member in the sliding direction in a state of contacting with the other member and assists the spring-up of the extension portion in accordance with the sliding of the other member or the one member, and a second spring-up portion that is formed on the other side in the sliding direction in the state of contacting with the other member and assists the spring-up of the extension portion in accordance with the sliding of the other member or the one member.

8. The image forming apparatus according to claim 4, wherein the assist portion includes
a first spring-up portion that is formed on one side of the other member or the one member in the sliding direction in a state of contacting with the other member and assists the spring-up of the extension portion in accordance with the sliding of the other member or the one member, and
a second spring-up portion that is formed on the other side in the sliding direction in the state of contacting with the other member and assists the spring-up of the extension portion in accordance with the sliding of the other member or the one member.

9. A sealing member that seals a gap between one member and the other member, the sealing member comprising:
a mounting portion that is mounted on the one member; and
a contact portion that extends from a mounting portion side to another member side and contacts with the other member,
wherein the contact portion includes an expansion portion that expands in a direction of being separated from the mounting portion in a state where the other member does not contact therewith and a branch portion that is branched from one end of the expansion portion on the other member side with a curvature,
wherein the branch portion has assist portions extending from a portion which is branched from the expansion portion to the mounting portion side,
wherein the assist portions are respectively branched off from the branch portion and expanded in a width and opposite directions toward an outside with respect to the expansion portion, and
wherein one end of the assist portions and an other end of the assist portions are respectively extended toward the expansion in a width direction of the sealing member.

10. The sealing member according to claim 9,
wherein the expansion portion is a plate member linearly expanding from the mounting portion in the state where the other member does not contact therewith, and
wherein the branch portion is branched from the expansion portion to both surface sides of the expansion portion.

11. The sealing member according to claim 9,
wherein the branch portion includes
a first bent portion that is bent in a position close to the branch portion branched from the expansion portion in a direction away from the expansion portion, and
a second bent portion that is bent in a position away from the branch portion from the first bent portion in a direction close to the expansion portion.

12. The sealing member according to claim 9,
wherein the branch portion includes a low-friction portion that is formed in a region being in contact with the other member and has a friction force, which is lower than those of other portions of the contact portion, generated between the branch portion and the other member.

13. An image forming apparatus comprising:
an image forming portion that forms an image on a sheet;
a housing that has an opening in a position that is set in advance;
an opening and closing member that is able to open and close the opening of the housing;
a sealing member that seals a gap between the opening and closing member and a facing portion facing the opening and closing member;
a mounting portion that is mounted on the one member; and
a contact portion that extends from a mounting portion side to another member side and contacts with the other member,
wherein the contact portion includes an expansion portion that expands in a direction of being separated from the mounting portion in a state where the other member does not contact therewith and a branch portion that is branched from one end of the expansion portion on the other member side with a curvature,
wherein the branch portion has assist portions extending from a portion which is branched from the expansion portion to the mounting portion side, and
wherein one end of the assist portions and an other end of the assist portions are respectively extended toward the expansion portion in a width direction of the sealing member.

* * * * *